Jan. 12, 1971 E. W. JOHNSON 3,554,792

WELDING ELECTRODE

Filed Oct. 4, 1968

TERNARY FLUX CONSTITUTION DIAGRAM

WITNESSES
Wm. B. Sellers
James T. Young

INVENTOR
Edwin W. Johnson
BY Lee P. Johns
ATTORNEY

United States Patent Office 3,554,792
Patented Jan. 12, 1971

1

3,554,792
WELDING ELECTRODE
Edwin W. Johnson, Murrysville, Pa., assignor to Westinghouse Electric Corporation, Pittsburgh, Pa., a corporation of Pennsylvania
Filed Oct. 4, 1968, Ser. No. 765,159
Int. Cl. B23k 35/22
U.S. Cl. 117—205          12 Claims

ABSTRACT OF THE DISCLOSURE

High-strength austenitic steel arc welding electrodes which electrodes are productive of weld deposits having low susceptibility to hot cracking as well as having high creep-rupture strength and ductility in the as-welded condition. The coating, applied to austenitic steel core wire containing most of the desired alloy elements of the final weld deposit, is composed, in parts by weight (p.b.w.), of from about 5 p.b.w. to about 40 p.b.w. of $CaF_2$, from about 5 p.b.w. to about 25 p.b.w. of $Cr_2O_3$, from about 10 p.b.w. to about 15 p.b.w. of a binder consisting of an alkali-metal silicate and about 0.5 p.b.w. of an organic gum such as sodium carboxymethyl cellulose, up to about 10 p.b.w. $CaMoO_4$, up to about 10 p.b.w. Mn metal powder, up to 0.2 p.b.w. boron, other alloy metal powders as needed to provide the desired final alloy composition of the weld deposit, and the balance being at least one compound of a group consisting of $TiO_2$ and the titanates of the alkali and alkaline-earth elements along with incidental impurities.

CROSS REFERENCE TO RELATED APPLICATION

This application is related to copending application Ser. No. 765,037 filed on Oct. 4, 1968.

BACKGROUND OF THE INVENTION

Field of the invention

This invention relates to an arc welding electrode for producing fully austenitic steel weld deposits having low susceptibility to hot cracking, high creep-rupture strength and ductility in the as-deposited condition. More particularly, the invention pertains to a coating for welding electrodes for limiting the contamination of the weld deposit by undesirable elements during welding.

Description of the prior art

It is well known that the ultimate or limiting thermodynamic efficiency of the conversion of heat into mechanical or electrical energy is directly proportional to the difference between the temperatures of the heat source and of the heat sink. In the case of a steam-turbine powered electrical generating plant, this theoretical efficiency is determined by the maximum steam temperature, which fact provides a major incentive for the use of steam at the highest possible temperature in such plants. This is the dominant reason for the historical fact that steam temperatures actually employed in steam-power plants have increased in an almost continuous manner for several decades.

2

The trend toward higher steam temperatures has required that increasing attention be paid to the limitations of the materials used in various portions of the steam-turbine plant installation, not the least important of which is the piping through which the steam is conducted. At the lower steam temperatures used in the past, such piping was fabricated of low-alloy ferritic steels, which were satisfactory. At the higher steam temperatures used in the more modern plants and contemplated for more extensive use in the future, the mechanical properties of these ferritic steels are less favorable, due primarily to the fact that the strengths of such steels decline rapidly with increasing temperature. For use with higher-temperature steam, therefore, ferritic steel piping must have thicker walls. This results in increased weight per unit length of pipe and requires also the use of larger expansion loops, which in turn necessitate the use of longer piping runs, construction of larger buildings, among other things.

It is well known that austenitic steels are much stronger than ferritic steels at the steam temperatures in question; namely, the range of temperatures from about 1000 to about 1200° F. Because of this higher strength, the use of extra-thick-walled pipe, large expansion loops and the like can be obviated to a considerable degree by the use of austenitic steel piping. However, the use of austenitic steel steam piping in the past has been characterized by major difficulties peculiar to the austenitic steel itself. For example, the problem of weld hot cracking, wherein a weld bead tends to crack in a brittle manner at an early stage of cooling from its solidification temperature in the presence of ordinary stresses, is a generally more troublesome problem in austenitic steels than in ferritic steels. Also, longer-term failures of welded joints in austenitic steel steam piping have been found to occur under conditions symptomatic of severe or abnormal weakness and/or brittleness of the joint in a stress-rupture or creep-rupture mode of failure. As a consequence of these failures of austenitic steel welded joints, there has been understandable hesitation to adopt austenitic steels as steam piping materials except on an experimental basis.

It has been found in accordance with this invention that a suitable coating for the core wire of an arc welding electrode is composed of the desired mixture of chemical elements and compounds, which result in a welded joint which is characterized by high creep-rupture strength and ductility along with superior resistance to weld-bead hot cracking.

Accordingly, it is an object of this invention to provide a coating for an arc welding electrode which is productive of sound welded joints between conduits of austenitic steels and having the properties of high tensile and creep-rupture strength and ductility in the "as-welded" condition.

It is another object of this invention to provide an arc welding electrode which is productive of a weld deposit having low susceptibility to hot cracking during welding.

It is another object of this invention to provide an arc welding electrode having a coating which satisfactorily controls contamination of the welded joint.

It is another object of this invention to provide an arc welding electrode having a coating which aids in preventing contamination of the welded joint by unwanted elements such as carbon, silicon, sulfur, phosphorus, and oxygen.

Finally, it is an object of this invention to satisfy the

SUMMARY OF THE INVENTION

Generally, the arc welding electrode of the present invention comprises a core wire of an austenitic steel surrounded by a coating, the coating being composed of from about 5% to about 40% of one or more fluorides such as cryolite and fluorspar, from about 5% to about 25% of $Cr_2O_3$, from about 10% to about 15% of a binder consisting of an alkali-metal silicate, about 0.5% of a slip agent consisting of a water-soluble gum such as sodium carboxymethyl cellulose, up to about 10% of $CaMoO_4$, up to about 10% of manganese metal powder, up to about 0.2% of boron in metallic, master-alloy, or compound form, additional metal powders as needed to provide the desired alloy composition of the final weld metal, and the balance being at least one compound of a group consisting of $TiO_2$ and the titanates of the alkali and alkaline-earth elements along with incidental impurities including $H_2O$. The core wire of austenitic steel refers to all such steels and particularly suitable with such steels having at least 0.01% carbon. This invention however excludes the alloys of copending application Serial No. 765,037 filed Oct. 4, 1968.

BRIEF DESCRIPTION OF THE DRAWINGS

For a better understanding of the invention, reference is made to the appended drawings, in which.

DESCRIPTION OF THE PREFERRED EMBODIMENTS

Figure 1:
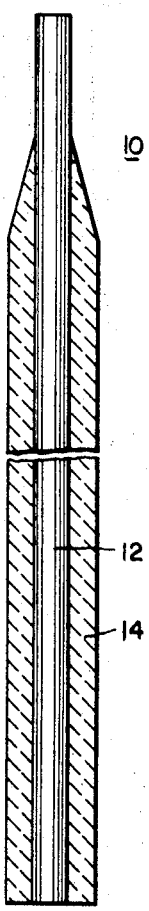
FIG. 1 is a vertical section view of an arc welding electrode.

The present invention is directed toward the solution of problems of welding and using austenitic steels, particularly in steam turbine piping. The invention consists, in particular, of a coating that can be applied to an austenitic steel core wire to produce a welding electrode, the welded joints derived from which are superior to those derived from austenitic steel welding electrodes of the prior art both in being more nearly free of hot cracking and also, very importantly, in possessing higher creep-rupture strength and ductility in the as-welded condition.

The freedom from weld hot cracking provided by the present invention is derived primarily but not exclusively from the use of a core wire of such a chemical composition that the resultant weld composition will fall, with minor exceptions, within the range of compositions of the fully austenitic steels such as high strength alloys as disclosed in U.S. Pat. No. 3,201,233 (hereinafter called "high strength alloys"). A nominal range of composition of such steels is as follows:

Table I

| | Weight percent |
|---|---|
| Chromium | 14–20 |
| Nickel | 15–30 |
| Manganese | 7.5–15 |
| Molybdenum | 0.5–3.75 |
| Mn and Mo total | 9–16 |
| Carbon | 0.01–0.08 |
| Nitrogen | 0.01–0.35 |
| Silicon | Up to 1 |
| Vanadium | Up to 0.3 |
| Boron | Up to 0.03 |
| Zirconium | Up to 0.06 |
| Iron | Balance |

While the alloy composition range of such steels is not a part of the present invention, the electrode coatings herein disclosed were developed and tested with covered-electrode core wires of this composition with successful results. These coatings may be employed with core wires of other alloy compositions, and in particular those of other austenitic steels.

Satisfactory freedom from weld hot cracking has been found to require that suitable control be exercised also over the concentrations of certain other elements not listed in Table I. For example, the presence of phosphorus in amounts exceeding about 0.10% in the weld metal has been found to be detrimental with respect to weld hot cracking. A similar effect has been found to result from deliberate additions of about 2.5% ferroniobium powder to the electrode coating, this effect being presumably a consequence of the presence of approximately 0.3% niobium in the resulting weld deposit. Hot cracking of austenitic steel welds has also been attributed to sulfur and other contaminating elements. The preferred way of avoiding hot cracking of the welds, therefore, is to maintain the major alloy element concentration ranges within those of the high strength alloys while also suitably limiting contamination by phosphorus, sulfur, niobium, and possibly other elements. These requirements are well satisfied by the present invention.

Of equal importance is the requirement that the weld deposit remain both strong and ductile during the entire service lifetime of the welded structure. Tensile tests of the weld metal at the various temperatures of intended service should indicate, for example, that the welds are both strong and ductile under such short-term testing conditions. All such requirements are well satisfied by the weld deposits derived from the present invention.

A more difficult requirement to satisfy is the retention of the weld's strength and ductility under conditions of creep-rupture or stress-rupture failure for its entire service lifetime. The weld metal of the present invention satisfies the requirement of weld rupture strentgh and ductility in the as-welded condition. Thus, time-consuming post-weld heat treatments that are routinely given to prior-art austenitic steel welds may be omitted when the welds are drived from the electrodes of the present invention.

The unusually high rupture strength and ductiilty of the as-deposited, fully austenitic steel weld metal derived from the present invention are obtained only if the carbon and silicon concentrations of the weld metal do not exceed certain levels. The carbon is limited because it otherwise combines with such elements as Cr and Mo to form carbide precipitates at the grain boundaries, resulting in progressive loss of rupture ductility. This loss of rupture properties is a more serious problem in weld metal than in wrought alloy material of the same chemical composition, due presumably to the larger grain size and correspondingly less extensive total grain boundary area of the weld metal.

The problem is greater with weld metal derived from covered welding electrodes, because conventional covered-electrode coatings contain sufficient amounts of carbonates and silicates to yield intolerably high concentrations of carbon and silicon in the weld metal. To obtain an acceptably low carbon concentration in the weld metal, the core wire and the coating of the welding electrode should have suitably low carbon contents. The carbon in the core wire should preferably be no higher than that desired in the weld metal. However, the electrode coating can also serve as a source of carbon contamination. Accordingly, the coating of this invention is made from ingredients having the lowest practicable carbon contents. In particular, no carbonates, carbides, high-carbon master alloys or other such known sources of carbon are used as coating ingredients. However, sodium carboxymethyl cellulose (CMC) in the coating flux is desirable as an aid to slip during extrusion and also as a bonding aid. Relatively small amounts of other carbonaceous ingredients such as carbonates and various impurities containing carbon could be tolerated also, but considerable care must be taken in view of the fact that the cumulative effect of the presence of such carbon sources is to increase the carbon concentration of the weld metal, and this consequence is undesirable in the case of at least the fully austenitic weld metal with which this invention is primarily concerned.

Silicon contamination of the weld metal is similarly avoided in this invention by omitting any solid silicate ingredients such as clay, mica, and ferrosilicon. On the other hand, the principal bonding agent employed is a so-called water-soluble silicate of the class of sodium and potassium silicates, the particular ingredient used in all the preferred embodiments of the invention being potassium silicate of the approximate composition $$K_2O \cdot 3SiO_2 + H_2O$$

This ingredient is employed as an aqueous solution or suspension having a solids content of about 10% to 15% of the total dry weight of the coating flux. The resulting concentration of silicon in the weld deposit is within the range of from about 0.10% to 0.40%, depending on the concentrations of other ingredients of the flux and the core wire. Silicon concentrations of up to about 0.25% in the weld metal are acceptable while those exceeding about 0.30% are sufficiently high to exert noticeably detrimental effects on the weld creep-rupture ductility and are preferably avoided.

In FIG. 1 an arc weld electrode is generally indicated at 10. It includes an elongated wire core 12 and a coating 14 which completely surrounds a greater portion of the wire core. The coating 14 is applied to the wire core 12 in any convenient manner and is preferably applied by extrusion of the flux in the form of an aqueous paste followed by heating in a circulating-air oven in increasing-temperature steps up to a final temperature of approximately 700° F. for the purpose of drying and providing a satisfactorily bonded coating.

Figure 2:
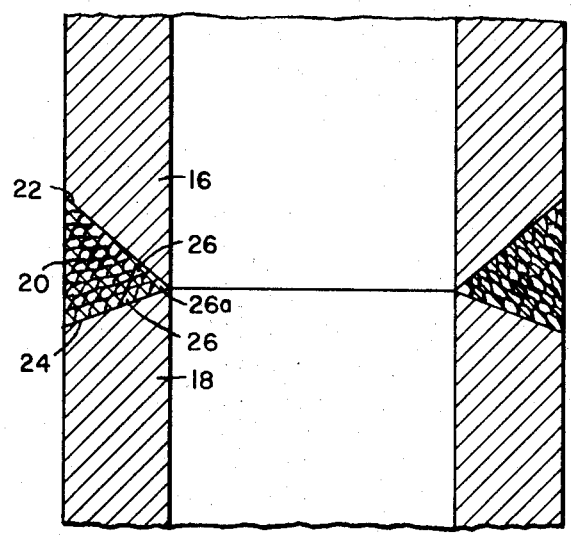
FIG. 2 is a vertical sectional view through a welded joint between abutting ends of steel conduits.

A typical welded structure that might result from the use of this invention is schematically shown in FIG. 2. The structure includes a pair of conduits 16 and 18 which are joined together by a welded joint 20 disposed between the end surfaces 22 and 24 of the conduits 16 and 18, respectively. The joint is composed of a plurality of annular beads 26 which are applied from the inside out, starting with an initial bead 26a, upon which the successive beads are subsequently applied until the V-shaped void between the end surfaces 22 and 24 is completely filled with the weld metal 20.

As the successive annular beads 26 are applied, it is the usual practice to apply first the beads along the end surface 24 of the lower conduit 18 to help prevent flow of the molten weld metal out of the joint during the welding operation. The welding is preferably performed with the conduits 16 and 18 disposed in the vertical-axis position as indicated in FIG. 2, such that each weld bead 26 has a horizontal orientation. This mode of welding is commonly known as "horizontal position welding."

Where the conduits 16 and 18 are composed of an austenitic steel, such as Type 316 and high strength alloys the core wire 12 (FIG. 1) is preferably composed of an austenitic alloy of approximately the same composition as the conduit. The elevated-temperature strengths of such austenitic alloy materials relative to that of a commonly used (2¼% Cr. 1% Mo) ferritic steel are presented in Table II, which depicts for each alloy a typical value of the 1000-hour rupture strength measured at a temperature of 1200° F. Although the actual serivce temperature of steam turbine piping is usually lower, being typically in the range of 1000 to 1050° F., the relative strength of the various materials depicted in Table II are the same at all such temperatures. The explanation for this is derived from the fact that the major effect of increasing the temperature of creep-rupture testing is to accelerate the creep-rupture process consistent with an activation of energy of about 100,000 calories per gram atom, in accordance with which a creep-rupture test duration of 1000 hours at 1200° F. can be considered to be essentially equivalent to a test duration of about 200,000 hours at a temperature of about 1050° F. This relationship was exploited in the extensive creep-rupture testing of welds derived from the present invention, wherein a creep-rupture test temperature of 1200° F. was used for simulating actual welded joint behavior on an accelerated basis. The creep-rupture test results obtained at a temperature of 1200° F. can be regarded as quantitatively representative of the weld behavior that is expected to occur much more slowly at the actual service temperature of 1000 to 1050° F.

Table II

| Steel type: | 1000-hr. rupture strength at 1200° F., p.s.i. |
|---|---|
| Ferritic (2¼ Cr, 1 Mo, bal. Fe) | 8,000 |
| AISI 316 | 20,000 |
| High strength alloys | 25,000–35,000 |

The welding electrode coating 14 is composed of five primary ingredients with or without additional elements or compounds, to obtain varying desired effects on the weld creep-rupture properties as well as other welding characteristics. The primary coating ingredients include a fluoride, $Cr_2O_3$, a silicate binder, and $TiO_2$. Extrusion of the coating is aided by the additional inclusion of a small amount of a slip agent such as CMC. Varying amounts of other compounds or elements may be added for further adjusting the various weld properties and welding characteristics, such substances including calcium molybdate ($CaMoO_4$), one or more titanates such as potassium titanate, and one or more metal powders such as manganese. Boron may be added to provide metal having higher creep-rupture ductility.

The amounts of the various coating ingredients are expressed in units of "parts by weight," (p.b.w.), where 1 p.b.w. is defined as one weight percent of the total amount of only the nonmetallic ingredients of the coating exclusive of $H_2O$. These units are used for expressing the relative amounts of both the metallic and the nonmetallic substances present in the flux. For example, if the total metal powder content of a flux is 20% by weight and the rutile content is 40%, the concentrations of these same ingredients in the units of parts by weight are 25 and 50 p.b.w., respectively. If the total metal powder content is 50% and the rutile content is 20%, the respective concentrations are 100 p.b.w. metal (total) and 40 p.b.w. rutile. The amount by which the total number of p.b.w. exceeds 100 is thus a direct function of the total metal powder content of the flux.

The coatings for the fully austenitic steel welding electrodes are broadly described in Table III together with two optional compositions, as follows:

TABLE III

| | Coating compositions, parts by weight | | |
|---|---|---|---|
| | Range | Option A | Option B |
| $CaF_2$ | 5–40 | 10–30 | 20–35 |
| $CaMoO_4$ | 0–15 | 5 | |
| $Cr_2O_3$ | 5–25 | 10 | 10–25 |
| Boron [1] | 0–0.5 | 0.1–0.2 | 0.1–0.2 |
| Binder [2] | 10–15 | 11 | 11 |
| CMC | 0–1 | 0.5 | 0.5 |
| Metal powder, Mn | 0–10 | 3 | |
| Titanate [3] | 0–30 | 10–20 | 0–10 |
| Rutile ($TiO_2$) | [4] | [4] | [4] |

[1] FeB (ferroboron) contains 20% boron.
[2] One or more of the titanates of the alkali or alkaline earth metals
[3] Alkali silicate binder exclusive of $H_2O$ content.
[4] Balance.

The chemical and physical functions of the various coating ingredients are known only in varying degrees. CMC serves primarily as a slip agent for aiding extrusion while the alkali silicate serves as a binder to keep the coating intact until such time as the electrode is actually used in welding. The primary role of the manganese metal powder is presumed to be that of a chemical reducing agent or deoxidizer, alloying being an additional but secondary function. The fluorides, including both fluorspar and cryolite, are primarily fluxing agents that aid the impurity-scavenging action of the molten slag. The fluorides as well as the $TiO_2$ and titanates also influence certain physical properties of the slag including the slag's fluidity while molten and ease of removal after solidification. The small proportion of ferroboron (or other boron-containing material) has the primary function of introducing a particular amount of boron into the weld deposit.

$Cr_2O_3$ and $CaMoO_4$ are known to be sources of alloyed Cr and Mo. The results of using other techniques of enriching the weld metal with the same elements has led to the conclusion that the alloying effects alone are insufficient to explain the various metallurgical benefits gained from the presence of $Cr_2O_3$ and $CoMoO_4$ in the coating. These compounds are sources of oxygen, the liberation of which would have the effect of limiting the contamination of the weld metal by oxidizable impurities including carbon, silicon, and sulfur. The beneficial effect of the $CaMoO_4$ may be based on the known volatility of $MoO_3$ at the welding temperature. The volatilization of the $MoO_3$ has two desirable effects. First, the liberated vapor would serve as a gas atmosphere shield to protect the molten weld metal from chemical attack by the air, acting in an analogous way to the $CO_2$ gas that is liberated from the $CaCO_3$ used in many conventional electrode coatings. Another benefit is that the residual condensed material is CaO, which is a strongly basic ingredient of the slag that is extremely desirable for aiding the prevention of contamination of the weld metal by acid-oxide-forming elements including sulfur, phosphorus, and silicon. Most of the molybdenum initially introduced in the form of $CaMoO_4$ is recovered as an alloy suggesting that complete volatilization of the $MoO_3$ does not occur. A combination of all of these possible mechanisms is the best explanation for the beneficial effects of the $CaMoO_4$ on the mechanical properties of the as-deposited weld metal.

The following example is illustrative of the invention:

EXAMPLE

Over 200 flux formulae were prepared and applied by extrusion onto segments of core wire, each having a length of 14 inches and a diameter of either 5/32 or 1/8 inch. The core wire segments were high strength alloys. The resulting electrodes were used to make "downhand" manual arc weld deposits in 7/8-inch-deep V-shaped grooves in base plates of stainless steel of Type 316, or high strength alloys. A total of from 15 to 20 passes were needed to fill each groove. During the initial passes attention was paid to any tendency of the weld metal to exhibit hot cracking, and a score of from 0 (very poor) to 4.0 (excellent) was assigned on the basis of the weld metal's "hot cracking resistance," abbreviated HCR in Table IV below. Another score of from 0 (very poor) to 4.2 (exceptionally good) was assigned to the ease with which the slag could be removed from the weld bead, this "slag removal ease," abbreviated SRE. Longitudinally oriented mechanical test specimens were made from the weld deposits and creep-rupture tested in the "as-welded" condition.

The electrodes were additionally tested in horizontal-position welding (HPW) trials, each of which consisted of making three welding passes in horizontally oriented V-shaped grooves machined in vertical-axis pipe. The suitability of the electrodes for such welding was assigned an HPW score of from 0 (unsuitable) to 4.0 (excellent).

The welding properties derived from a group of such tests are presented in Table IV, which shows the effects of varying the compositions of electrode flux coatings applied to core wire derived from a single heat. All of the data in Table IV characterize welds made from these electrodes deposited in Type 316 stainless steel plate except for the HPW and SRE scores of the high strength alloys.

The compositions of the several electrode coatings listed in Table IV include a range of fluorspar ($CaF_2$) contents of from 10 to 40 p.b.w., a range of $Cr_2O_3$ contents of up to 30 p.b.w., from 0 to 4 p.b.w. Mn metal powder, from 0 to 20 p.b.w. potassium titanate of the approximate formula $K_2Ti_3O_7$, from 23 to 43 p.b.w. rutile ($TiO_2$), and from 0 to 5 p.b.w. $CaMoO_4$ with occasional additions of ferroniobium, calcium titanate and barium chromate.

TABLE IV

[Weld properties [1] (alloy wire F137)]

| Weld deposit No. | Parts by weight | | | | | | Add | HPW | SRE | HCR | Stress (k.p.s.i.) | Hours to rupture | Elongation (percent) | R.A. (percent) | M.C.R. (percent/hour) |
|---|---|---|---|---|---|---|---|---|---|---|---|---|---|---|---|
| | $CaF_2$ | $CaMoO_4$ | $Cr_2O_3$ | Mn | $K_2Ti_3O_7$ | $TiO_2$ | | | | | | | | | |
| 234 | 10 | 5 | 10 | 4 | 20 | 43 | | 2.5 | 3.5 | 3.8 | 32.5 / 30.0 | 119 / 485 | 4.7 / 3.0 | 25.5 / 17.0 | 0.0200 / 0.0018 |
| 255 | 20 | 5 | 10 | 4 | 20 | 33 | .5FeNb | 2.8 | 4.0 | 2.2 | 32.5 | 361 | 4.7 | 17.7 | 0.0033 |
| 242 | 20 | 5 | 10 | 4 | 20 | 33 | | | 4.0 | 4.0 | 32.5 / 30.0 | 143 / 371 | 9.0 / 7.0 | 16.6 / 17.2 | 0.0200 / 0.0058 |
| 242 | 20 | 5 | 10 | 4 | 20 | 33 | | | 4.0 | 4.0 | 32.5 / 30.0 | 134 / 278 | 6.3 / 8.0 | 16.0 / 13.6 | 0.0260 / 0.0015 |
| 257 | 20 | 5 | 20 | 3 | 10 | 33 | | 2.2 | 3.0 | 2.2 | 32.5 | 336 | 9.3 | 19.2 | 0.0110 |
| 249 | 20 | 5 | 20 | 4 | 10 | 33 | | | 3.8 | 4.0 | 32.5 / 30.0 | 164 / 194 | 8.0 / 8.0 | 22.2 / 17.0 | 0.0120 / 0.0170 |
| 275 | 20 | 5 | 30 | 3 | | 33 | | 1.6 | 0.2 | 4.0 | | | | | |
| 260 | 30 | | 10 | | 15 | 33 | | 3.5 | 4.2 | 1.0 | 32.5 | 408 | 10.0 | 14.0 | 0.0067 |
| 266 | 33 | | 22 | | | 33 | | 3.7 | 3.8 | 4.0 | 32.5 | 135 | 6.0 | 17.0 | 0.0150 |
| 267 | 22 | | 11 | | | 33 | [2] 22 | 3.7 | 4.2 | 2.2 | | | | | |
| 264 | 23 | 5 | | 3 | 10 | 33 | [3] 17 | 2.0 | 3.8 | 4.0 | | | | | |
| 280 | 30 | 5 | 10 | 3 | 10 | 33 | | 3.2 | 4.2 | 4.0 | 35.0 / 32.5 / 32.5 | 143 / 273 / 146 | 8.7 / 7.0 / 7.3 | 27.0 / 29.7 / 19.5 | 0.0230 / 0.0021 / 0.0071 |
| 280 | 30 | 5 | 10 | 3 | 10 | 33 | | 3.2 | 4.2 | 4.0 | 35.0 / 32.5 | 305 / 503 | 7.7 / 9.3 | 17.0 / 22.0 | 0.0140 / 0.0059 |
| 259 | 30 | 5 | 10 | 3 | 10 | 33 | | | 4.2 | 4.0 | 35.0 / 32.5 | 188 / 602 | 11.3 / 13.3 | 24.6 / 18.0 | 0.0350 / 0.0110 |
| 251 | 30 | 5 | 10 | 4 | 10 | 33 | | | 4.2 | 4.0 | 32.5 / 30.0 | 82 / 711 | 12.7 / 12.0 | 23.2 / 24.5 | 0.0520 / 0.0025 |
| 274 | 30 | 5 | 20 | 3 | | 33 | | 3.3 | 2.2 | 4.0 | 35.0 / 32.5 | 141 / 395 | 10.3 / 14.7 | 26.0 / 35.0 | 0.0300 / 0.0120 |
| 279 | 40 | 5 | | 3 | 10 | 33 | | 2.1 | 3.2 | 1.0 | | | | | |
| 273 | 40 | 5 | 10 | 3 | | 35 | | 3.2 | 4.2 | 1.0 | 37.5 | 77 | 11.0 | 26.4 | 0.0570 |
| 273 | 40 | 5 | 10 | 3 | | 35 | | 3.2 | 4.2 | 4.0 | 37.5 / 35.0 | 251 / 486 | 10.7 / 11.7 | 23.0 / 23.0 | 0.0210 / 0.0120 |
| 276 | 40 | 5 | 10 | 3 | | 33 | | 3.3 | 4.2 | | | | | | |
| 281 | 40 | 5 | 20 | 3 | | 23 | | | 0.0 | 4.0 | | | | | |

[1] Rupture test temperature 1,200° F.
[2] Calcium titanate.
[3] Barium chromate.

Most of the flux formulae listed in Table IV include 5 p.b.w. CaMoO₄. The use of CaMoO₄ in the flux improves the creep-rupture ductility of the as-deposited weld metal but results in poorer horizontal-position welding (HPW) characteristics. The use of 5 p.b.w. CaMoO₄ provides acceptable levels of both qualities. The optimum level of Cr₂O₃ in the flux from the standpoint of maximizing the slag removal ease (SRE) is about 10 p.b.w. Where both CaMoO₄ and Mn were omitted from the flux, the use of more Cr₂O₃ at concentrations up to about 25 p.b.w. was beneficial with respect to both the weld rupture ductility and the horizontal-position weldability, while the slag removal ease was not excessively decreased. These results are illustrated by the data in Table IV.

The three highest HPW scores in Table IV were those obtained in Deposit 260, 266, and 267, the coatings of which contained no CaMoO₄, or Mn metal powder. Deposit 266 had high values of both HPW and HCR.

The addition of CaMoO₄ and Mn metal powder to the flux in Deposit 274 resulted in a decrease of HPW from 3.7 to 3.3. Substantially similar HPW results were obtained in Deposits 273, 276, and 280. Of this group, satisfactory values of both HCR and SRE were obtained only in Deposit 280. Of all the coating flux formulae listed in Table IV, therefore, those of Deposits 266 and 280 had the best combination of values of HPW, HCR, and SRE. These formulae are within the ranges of Options B and A, in Table III.

Another coating formula is that of Deposit 234. This differs from the coating of Deposit 280 primarily in containing less CaF₂. An intermediate coating is that of Deposit 242. All three of these formulae are within the limits of Option A of Table III.

With a given coating, the slag removal ease (SRE) declined as the nitrogen content of either the core wire or the base material increased. The slag removal from the higher-strength, nitrogen-strengthened alloys was more difficult than that from lower nitrogen high-strength alloy.

For any given combination of weld-metal and base-material alloys, the SRE was found to be a sensitive function of the coating composition. This was particularly true of the coatings that contained 5 p.b.w. CaMoO₄ and 3 or 4 p.b.w. Mn, as represented by flux of Option A in Table III. The response of the SRE scores of such coatings to certain major coating ingredient variables is shown in the form of a ternary constitution diagram in FIG. 3. Replacing rutile by potassium titanate in the flux had no perceptible effect on SRE, and therefore the sum of the amounts of both ingredients was plotted as a single independent variable in FIG. 3. The other two independent variables are the Cr₂O₃ and CaF₂ contents. The respective SRE scores are shown as numbered contours occupying the field of the plot.

Figure 3:
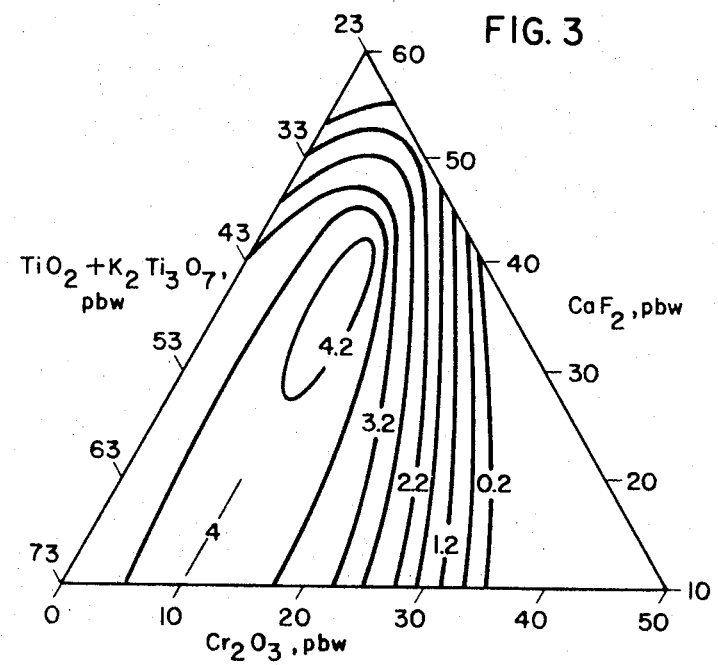
FIG. 3 is a constitution diagram showing the composition of coatings for a wire rod which coatings facilitate slag removal from the welded joint during welding.

FIG. 3 shows clearly that maximum SRE values indicative of excellent slag removal were consistently obtained from the use of 10 p.b.w. Cr₂O₃. The SRE deteriorated rapidly, moreover, on further increasing the concentration of the Cr₂O₃, especially when the CaF₂ content was relatively high. The best assurance of freedom from slag removal difficulties with the Option A flux, therefore, is gained from the use of Cr₂O₃ contents very near 10 p.b.w.

The HCR score for a given weld was assigned a value of 4.0 only if no cracks were visible in the body of the weld or the terminal crater of any pass. Small crater cracks lowered the score to 3, and cracks in the body of the weld bead lowered the score to 2 or less.

The severity of weld bead cracking appears to be a more sensitive function of minor alloying and impurity elements than of any major alloy or slag ingredients. For example, the flux of Deposit 255 was identical to that of Deposit 242 except that it also contained 0.5 p.b.w. ferro-niobium. The resulting addition of about 0.05% Nb to the weld metal was apparently responsible for the lowering of the HCR score from 4 to 2.2. Also, additions of phosphorus to the weld metal, derived from calcium phosphate additions to the flux, resulted in severe hot cracking of the welds. The effectiveness of a particular flux in controlling hot cracking, therefore, is probably related primarily to its ability to control contamination of the weld metal by particular elements.

Of the three fluxes that contained no CaMoO₄ in Table IV, only Deposit 266 (which contained 22 p.b.w. Cr₂O₃ yielded a crack-free deposit. On the other hand, crack-free deposits were obtained from most of the fluxes that contained 5 p.b.w. CaMoO₄. For the latter group of fluxes, the data presented in Table IV suggest that the optimum concentration of Cr₂O₃ from the standpoint of hot-cracking resistance is very nearly 10 p.b.w. while that of the CaF₂ is below 40 p.b.w.

A silient object of the covered electrode of this invention is to provide sound as-deposited weld metal having acceptable elevated-temperature mechanical properties, specifically creep-rupture ductility. These properties are of paramount importance to assure the soundness and safety of the welded structures in long-term service at elevated temperatures. In the past, a tendency of the as-deposited weld metal to exhibit low rupture ductility after various periods of time at elevated temperatures has been an indication of excessive brittleness of the welded joints. The brittleness problem has been solved by providing as-deposited weld metal with fully acceptable rupture ductility at all values of the rupture time.

The as-deposited rupture properties of any given weld are primarily a function of its chemical composition, and in this respect certain elements are far more potent than others. Carbon, for example, is detrimental to the weld rupture ductility that carbon concentrations in excess of about 0.03% cannot be tolerated in the higher-strength welds derived from the present invention. Silicon concentrations exceeding about 0.25% are similarly intolerable.

Austenitic steel covered-electrode weld metal derived from conventional covered electrodes almost invariably contains amounts of carbon and silicon in excess of these tolerable limits. The electrodes of this invention have the capability of providing weld metal with lower carbon and silicon contents than were previously available. The present invention provides favorable as-deposited weld rupture properties as a direct consequence of the unusually low carbon and silicon contents of the as-deposited weld metal. The welding-electrode coatings of this invention are capable of providing the superior mechanical properties of the weld metal when used in combination with core wires having specified chemical compositions. The core wire is also a source of carbon and other undesirable impurities in the weld metal, and if the concentrations of these impurities are allowed to exceed certain specified levels the mechanical properties of the resulting welds are unacceptable. In the case of carbon, numerous chemical analyses have demonstrated that the concentration of carbon in the weld metal derived from the use of the present invention is the same, on the average, as that in the core wire of the electrodes from which the weld metal was derived. To satisfy a maximum tolerable limit of about 0.03% carbon in the weld metal requires that a maximum tolerable limit of about 0.03% carbon be imposed upon the core wire.

The chemical composition restrictions on the core wire do not diminish the value of the coatings of the present invention. Conventional welding electrode coatings are also sources of carbon, silicon, and other undesirable impurities that can contaminate the weld metal. The fact that the present coating is, in effect, not a source of analytically detectable carbon contamination of the weld metal is sufficient to demonstrate the unique chemical characteristics of this coating.

A certain irreducible amount of silicon contamination of the weld metal has been found to result from the use of the invention because of its incorporation of a silicate binder such as that indicated approximately by the formula $K_2Si_3O_7$. The silicon content of the resulting weld metal usually varies from 0.1% to as high as 0.4%, depending primarily upon the particular variation of the coating formula employed. Since the silicon content of the core wire was usually below this range, the coating must be regarded as the principal source of the silicon in the weld metal.

The coating is also a potential source of numerous other chemical elements in the weld metal, some of which elements may be desirable while others may be undesirable. Boron, for example, at concentrations of up to about 0.015% in the weld metal is extremely desirable for optimizing the weld creep-rupture properties, and all or part of the boron desired in the weld metal can be introduced as a carefully measured addition of ferroboron powder or some other boron-containing material in the coating mixture.

The actual concentrations of most other chemical elements in the weld metal and their possible effects on the weld properties were not investigated in detail, and therefore the interrelationships of the present invention with such elements are still unknown. Instead, primary attention was given to the formulation of strictly empirical correlations of the vairous flux constitution variables with the weld creep-rupture properties, including particularly the rupture ductility.

It was essential to the success of this effort that the variations of the flux formula were evaluated in the absence of any simultaneous changes of either the core wire or the base material, and to this end the core wire for each group of coating-variation experiments was preferably derived from a single heat while the base material was preferably of a single alloy. In the case of the sample group of experimental data presented in Table IV, therefore, the core wire used in all the experimental electrodes from which the described welds were derived was from a high strength alloy heat designated Heat F137, and the base material was evclusively of AISI Type 316 stainless steel.

Wire Heat F137 was a relatively poor or marginal quality heat that is not necessarily representative of a high strength alloy core wire, particularly that wire containing lower amounts of carbon and other contaminating elements. The use of this mediocre wire is prefrered for the present illustrative purposes of demonstrating the effects of the several coating flux formula variations on the weld rupture ductility when the latter is within a particularly critical range.

In Table IV, the flux composition of Deposit 234 is within the limits of Option A shown in Table III. The resulting 485-hr. rupture elongation of 3.0% at 1200° F. is an unacceptably low ductility value. The addition of this flux to 10 p.b.w. fluorspar at the expense of rutile in Deposit 242 was responsible for an improvement of the weld rupture elongation, as may be seen from the fact that the lowest of the four measurements of the latter was 6.3%. An additional 10 p.b.w. increase of the fluorspar content at the expense of the potassium titanate content occurred in going to Deposits 251, 259, and 280. The lowest of the nine resulting elongation measurements was 7.0% and the highest was 13.3%, indicating that additional improvement of the ductility over that obtained from the lower-fluorspar fluxes was obtained. This improvement is also reflected in the respective values of the weld rupture reduction of area (R.A.).

An additional 10 p.b.w. increase of the fluorspar content of the flux was effected in Deposits 273, 276, and 279, the ductility values from which are at least 10% elongation and 23% R.A., but these fluxes are excluded from the preferred range of compositions because of their relatively poor HCR scores. Accordingly, approximately 30 p.b.w. fluorspar is viewed as the optimum amount in a flux containing 5 p.b.w. $CaMoO_4$ and 10 p.b.w. $Cr_2O_3$. This flux formula is within the range of Option A in Table III.

The omission of both $CaMoO_4$ and manganese metal powder characterizes the fluxes of Depositis 260, 266, and 267, the formulae of all of which are within the range of Option B in Table III. The resulting weld rupture ductility values are within the same general range as those derived from all of the various versions of flux Option A.

Additional weld rupture properties derived from the Option B flux are presented in Table V. The lowest weld rupture ductility values in Table V are all seen to have been derived from electrodes in which the flux coating contained no ferroboron. The use of 30 to 33 p.b.w. fluorspar and 10 to 22 p.b.w. $Cr_2O_3$ with at least 0.5 p.b.w. ferroboron provided the highest rupture ductility results for each wire and plate alloy combination shown in Table V, for the test temperature of 1200° F.

TABLE V.—WELD RUPTURE PROPERTIES

| Deposit No. | Alloy wire | Parts by weight | | | | | | Stress (k.p.s.i.) | Hours to rupture | Elongation (percent) | R.A. (percent) | M.C.R. (percent/hour) |
|---|---|---|---|---|---|---|---|---|---|---|---|---|
| | | $CaF_2$ | $K_2Ti_3O_7$ | $CaTi_3O_7$ | $Cr_2O_3$ | Mn | FeB | | | | | |
| 239 | F137 | 11 | 22 | | 11 | 4.1 | | 32.5 | 71 | 4.0 | 11.0 | 0.0070 |
| 239 | F137 | 11 | 22 | | 11 | 4.1 | | 37.5 | 66 | 5.3 | 19.0 | 0.0210 |
| | | | | | | | | 35.0 | 133 | 4.7 | 12.3 | 0.0067 |
| 250 | F137 | 10 | 20 | | 10 | 4.1 | 0.50 | 35.0 | 254 | 8.0 | 10.0 | 0.0130 |
| 261 | F137 | 15 | 15 | | 10 | 3.0 | 1.0 | 35.0 | 72 | 6.0 | 16.0 | 0.0240 |
| 292 | F137 | 20 | 10 | 20 | 10 | | 0.65 | 37.5 | 133 | 6.0 | 12.6 | 0.0140 |
| 267 | F137 | 22 | | | 22 | 11 | 1.0 | | | | | |
| 267 | F137 | 22 | | | 22 | 11 | 1.0 | 35.0 | 486 | 8.7 | 20.0 | 0.0120 |
| 260 | F137 | 30 | 15 | | 10 | | 1.0 | 32.5 | 408 | 10.0 | 14.0 | 0.0067 |
| 260 | F137 | 30 | 15 | | 10 | | 1.0 | 37.5 | 395 | 13.3 | 25.0 | 0.0150 |
| | | | | | | | | 35.0 | 501 | 7.3 | 16.6 | 0.0083 |
| 266 | F137 | 33 | | | 22 | | 1.0 | 32.5 | 135 | 6.0 | 17.0 | 0.0150 |
| 266 | F137 | 33 | | | 22 | | 1.0 | 37.5 | 133 | 9.3 | 16.0 | 0.0150 |
| | | | | | | | | 35.0 | 50 | 10.7 | 26.0 | 0.0470 |
| 204 | 91086 | 10 | 15 | 28 | 10 | | 0.65 | 32.5 | 72 | 6.7 | 25.0 | 0.0320 |
| | | | | | | | | 30.0 | 239 | 9.3 | 23.6 | 0.0090 |
| 239 | 91100 | 11 | 22 | | 11 | 4.1 | | 35.0 | 46 | 4.7 | 20.5 | 0.0420 |
| 228 | 91100 | 11 | 22 | | 11 | 8.2 | 0.65 | 35.0 | 118 | 8.7 | 23.0 | 0.0450 |
| | | | | | | | | 32.5 | 300 | 8.7 | 17.0 | 0.0110 |
| 214 | 91101 | 10 | 22 | 20 | 10 | 4.1 | 0.65 | 32.5 | 220 | 9.3 | 24.2 | 0.0190 |
| 214 | 91101 | 10 | 22 | 20 | 10 | 4.1 | 0.65 | 35.0 | 103 | 10.7 | 23.0 | 0.0200 |
| 287 | 1560 | 33 | | | 22 | | 1.0 | 32.5 | 103 | 10.0 | 32.0 | 0.0310 |
| | | | | | | | | 30.0 | 453 | 30.6 | 39.0 | 0.0079 |
| 294 | 7631 | 33 | | | 22 | | 1.0 | 40.0 | 102 | 48.7 | 56.6 | 0.0850 |
| 256 | VM843 | 20 | 10 | 20 | 10 | | 0.65 | 45.0 | 95 | 9.7 | 17.0 | 0.0180 |
| 287 | VM843 | 33 | | | 22 | | 1.0 | 50.0 | 76 | 24.6 | 27.0 | 0.1300 |
| | | | | | | | | 47.5 | 516 | 27.4 | 39.4 | 0.0180 |
| 287 | VM842 | 33 | | | 22 | | 1.0 | 47.5 | 206 | 26.7 | 29.2 | 0.0570 |
| | | | | | | | | 42.5 | 731 | 24.6 | 36.3 | 0.0120 |
| 271 | 7152 | 11 | 22 | | 11 | | 0.65 | 42.5 | 312 | 17.0 | 36.0 | 0.0220 |
| 256 | 7152 | 20 | 10 | 20 | 10 | | 0.65 | 45.0 | 86 | 24.3 | 32.7 | 0.1100 |
| 292 | 7152 | 20 | 10 | 20 | 10 | | 0.65 | 40.0 | 242 | 22.7 | 36.0 | 0.0460 |
| | | | | | | | | 40.0 | 306 | 25.3 | 34.5 | 0.0340 |
| | | | | | | | | 47.5 | 11 | 38.6 | 55.9 | 1.2500 |
| 204 | 7152 | 10 | 15 | 28 | 10 | | 0.65 | 42.5 | 200 | 20.0 | 31.7 | 0.0490 |
| | | | | | | | | 40.0 | 397 | 20.3 | 31.2 | 0.0170 |
| | | | | | | | | 35.0 | 1055 | 24.0 | 30.7 | 0.0057 |

TABLE V.—WELD RUPTURE PROPERTIES—Continued

| Deposit No. | Alloy wire | Parts by weight | | | | | | Stress (k.p.s.i.) | Hours to rupture | Elongation (percent) | R.A. (percent) | M.C.R. (percent/hour) |
|---|---|---|---|---|---|---|---|---|---|---|---|---|
| | | $CaF_2$ | $K_2Ti_3O_7$ | $CaTi_3O_7$ | $Cr_2O_3$ | Mn | FeB | | | | | |
| 250 | 7152 | 10 | 20 | | 10 | 4.1 | 0.50 | 45.0 | 80 | 25.0 | 34.0 | 0.1500 |
| | | | | | | | | 42.5 | 167 | 20.0 | 30.0 | 0.0420 |
| | | | | | | | | 40.0 | 312 | 18.3 | 34.0 | 0.0220 |
| 228 | 7152 | 11 | 22 | | 11 | 8.2 | 0.65 | 47.5 | 28 | 32.6 | 44.6 | 0.4900 |
| | | | | | | | | 40.0 | 162 | 12.7 | 27.0 | 0.0250 |
| 228 | 7152 | 11 | 22 | | 11 | 8.2 | 0.65 | 40.0 | 326 | 12.3 | 25.0 | 0.0170 |
| 294 | VM845 | 33 | | | 22 | | 1.0 | 47.5 | 174 | 31.3 | 42.2 | 0.0880 |
| | | | | | | | | 50.0 | 24 | 29.3 | 29.5 | 0.5500 |
| 256 | VM780 | 20 | 10 | 20 | 10 | | 0.65 | 45.0 | 87 | 24.0 | 35.0 | 0.1200 |
| | | | | | | | | 40.0 | 277 | 11.3 | 27.0 | 0.0170 |
| 294 | 7632 | 33 | | | 22 | | 1.0 | 50.0 | 54 | 44.0 | 51.5 | 0.1600 |
| | | | | | | | | 45.0 | 512 | 28.0 | 49.5 | 0.0210 |

TABLE VI.—WELD RUPTURE PROPERTIES

| Wire heat No. | FeB | Mn | CMC | Stress (k.p.s.i.) | Hours to rupture | Elongation (percent) | R.A. (percent) | M.C.R. (percent/hour) |
|---|---|---|---|---|---|---|---|---|
| 2053 | .50 | 4.1 | 0.5 | 32.5 | 240 | 2.3 | 10.4 | 0.0019 |
| 2585 | .50 | 4.1 | 0.5 | 32.5 | 171 | 4.0 | 17.7 | 0.0054 |
| 2585 | .25 | 4.1 | 0.5 | 30.0 | 149 | 4.3 | 17.7 | 0.0050 |
| | | | | 27.5 | 426 | 6.0 | 16.0 | 0.0017 |
| 2585 | | 4.1 | 0.5 | 32.5 | 10 | 5.0 | 24.0 | 0.1200 |
| 2585 | | 4.1 | 0.5 | 32.5 | 28 | 5.0 | 17.7 | 0.0370 |
| | | | | 27.5 | 147 | 4.3 | 9.6 | 0.0029 |
| 91086 | .32 | | 1.1 | 35.0 | 21 | 9.3 | 24.0 | 0.1600 |
| | | | | 32.5 | 47 | 10.7 | 45.3 | 0.0700 |
| 91086 | .32 | | 1.1 | 30.0 | 219 | 8.0 | 14.3 | 0.0110 |
| 91086 | .32 | | 1.1 | 35.0 | 14 | 14.7 | 29.0 | 0.4100 |
| | | | | 30.0 | 148 | 8.0 | 20.7 | 0.0140 |
| 91086 | .32 | | 1.1 | 35.0 | 38 | 9.3 | 13.0 | 0.0570 |
| | | | | 32.5 | 102 | 9.3 | 9.3 | 0.0170 |
| 91086 | .32 | 4.1 | 1.1 | 32.5 | 44 | 6.7 | 20.0 | 0.0460 |
| | | | | 30.0 | 280 | 10.7 | 22.2 | 0.0066 |
| 91100 | .65 | 8.2 | 0.8 | 35.0 | 71 | 10.7 | 21.2 | 0.0510 |
| | | | | 30.0 | 558 | 12.0 | 31.3 | 0.0016 |
| 91100 | .65 | 8.2 | 0.8 | 37.5 | 102 | 8.0 | 28.5 | 0.0420 |
| 91100 | .25 | 4.1 | 0.5 | 30.0 | 371 | 11.0 | 20.7 | 0.0062 |
| 91100 | | 4.1 | 0.8 | 30.0 | 89 | 10.0 | 19.0 | 0.0270 |
| 91100 | | 4.1 | 0.8 | 32.5 | 43 | 6.3 | 22.0 | 0.0580 |
| | | | | 30.0 | 118 | 5.3 | 16.0 | 0.0100 |
| 91100 | | 4.1 | 0.8 | 35.0 | 33 | 7.3 | 22.6 | 0.0710 |
| | | | | 30.0 | 133 | 4.0 | 11.0 | 0.0100 |
| 91101 | .32 | | 1.1 | 35.0 | 49 | 16.0 | 25.8 | 0.1200 |
| | | | | 32.5 | 92 | 12.0 | 30.0 | 0.0550 |
| 91101 | .32 | | 1.1 | 37.5 | 87 | 10.3 | 16.5 | 0.0540 |
| | | | | 35.0 | 58 | 10.0 | 29.3 | 0.0760 |
| 91101 | .32 | | 1.1 | 35.0 | 116 | 12.7 | 38.0 | 0.0400 |
| 91101 | .65 | 4.1 | 0.8 | 35.0 | 142 | 14.7 | 32.3 | 0.0370 |
| | | | | 30.0 | 830 | 19.0 | 30.2 | 0.0028 |
| 91101 | .65 | | 0.8 | 35.0 | 58 | 10.7 | 27.0 | 0.0640 |
| | | | | 30.0 | 698 | 17.3 | 29.7 | 0.0046 |
| 91101 | .65 | | 0.8 | 37.5 | 53 | 13.3 | 27.0 | 0.0790 |
| 91101 | .65 | | 0.8 | 37.5 | 94 | 8.7 | 20.0 | 0.0360 |
| | | | | 35.0 | 308 | 10.7 | 17.7 | 0.0096 |
| 91101 | .25 | | | 37.5 | 34 | 8.3 | 25.3 | 0.0790 |
| | | | | 32.5 | 180 | 5.3 | 7.7 | 0.0096 |
| 7134 | .50 | 4.1 | 0.5 | 37.5 | 138 | 34.3 | 58.5 | 0.0790 |
| 7631 | 1.0 | 3.0 | 0.5 | 37.5 | 524 | 36.7 | 53.5 | 0.0210 |

Large differences of the rupture ductility are associated with heat-to-heat changes of the core wire in Table V. In particular, the ductilities derived from wire Heats 7631 and 7632, which were manufactured by a special air melting process, are far higher than those of all the other wire heats listed. This ductility difference is most probably due to differences of the concentrations of carbon and possibly other impurities in the respective core wires.

The significant effects of the heat-to-heat variations of the compositions of the core wire on the weld rupture properties are evident also in Table VI, in which all the coatings described are minor variants of that of Deposit 234, which was previously described also in Table IV and is within the range of Option A described in Table III. The creep-rupture data in Table VI show that the omission of ferroboron from this coating had a detrimental effect on the weld rupture ductility, although this effect is minor in comparison with that found in the case of the Option B flux variations depicted in Table V. The largest variations of the weld rupture ductility are clearly those accompanying heat-to-heat changes of the core wire. The lowest ductility was that from wire Heat 2053, which had an analyzed carbon content of 0.033%, while the highest ductility was derived from Heats 7134 and 7631, which had carbon contents of 0.016 and 0.010%, respectively. Intermediate ductility results were derived from wire Heats 2585, 91086, 91100, and 91101, the carbon contents of which were within the range of from 0.020 to 0.029%. Thus, the weld rupture ductility increased dramatically as the carbon content of the core wire decreased through a range from 0.033 to 0.010%. This behavior characterizes the weld metal from electrodes with coatings having compositions within the ranges of both Option A and Option B, as described in Table III.

In summary, the crucially important property of the rupture ductility of the as-deposited weld metal is sensitively responsive to both the chemical composition of the core wire and that of the coating of the electrode. Particularly decisive variables are the carbon content of the wire and the concentrations of fluorspar, boron, $CaMoO_4$ and $Cr_2O_3$ in the coating.

The electrode coating of the present invention is distinguished from conventional coatings in including a particular combination of uncommon ingredients like $Cr_2O_3$, $CaMoO_4$, and boron along with more frequently used ingredients like rutile, fluorspar, manganese powder, and a silicate binder, in addition to which the present coating contains no significant amount of any carbonate, high-carbon ferroalloy or any other source of carbon as well as no significant amount of any source of silicon other than the alkali silicate employed as a binder. The use of this unique combination of ingredients results in weld metal having a carbon content essentially equivalent to that of the core wire along with unusually low silicon contents down to 0.1%. When this coating is used in combination with core wire of satisfactorily low carbon content, such as from about 0.01 to 0.02%, along with satisfactorily low concentrations of other impurity elements, such as Si, S, and P, the resulting fully austenitic steel weld metal is found to have high rupture strength and fully acceptable rupture ductility at all temperatures up to at least 1200° F. at all values of the rupture time when tested in the as-deposited condition.

While the best known embodiments of the invention have been illustrated and described in detail, it is understood that the invention is not limited thereto.

What is claimed is:

1. An arc welding electrode for weld deposits characterized by high creep-rupture strength and good ductility up to at least 1200° F. and low susceptibiltiy to hot cracking during welding, comprising an austenitic steel core wire, and a coating therefor, the coating comprising from about 5 p.b.w. to about 40 p.b.w. of a fluoride, from about 5 p.b.w. to about 25 p.b.w. of $Cr_2O_3$, from about 10 p.b.w. to about 15 p.b.w. of a silicate binder, the balance being $TiO_2$ and incidental impurities.

2. The electrode of claim 1 wherein the coating also comprises up to about 0.5 p.b.w. of boron.

3. The electrode of claim 1 wherein the coating also comprises up to about 15 p.b.w. of $CaMoO_4$.

4. The electrode of claim 2 wherein the coating also comprises up to about 15 p.b.w. of $CaMoO_4$.

5. The electrode of claim 3 wherein the coating also comprises up to about 10 p.b.w. of manganese.

6. The electrode of claim 1 wherein the coating comprises from about 20 p.b.w. to about 35 p.b.w. of $CaF_2$, and from about 10 p.b.w. to about 25 p.b.w. of $Cr_2O_3$.

7. The electrode of claim 6 wherein the coating comprises from about 0.1 p.b.w. to about 0.2 p.b.w. of boron.

8. The electrode of claim 4 wherein the coating comprises about 30 p.b.w. of $CaF_2$, about 10 p.b.w. of $Cr_2O_3$, about 10 p.b.w. of $K_2Ti_3O_7$, about 5 p.b.w. $CaMoO_4$, and about 3 p.b.w. of manganese.

9. The electrode of claim 1 wherein the coating comprises 30 p.b.w. of $CaF_2$, 5 p.b.w. $CaMoO_4$ and 10 p.b.w. of $Cr_2O_3$.

10. The electrode of claim 8 wherein the coating also comprises about 5 p.b.w. of $CaMoO_4$.

11. The electrode of claim 4 wherein the coating comprises about 10 p.b.w. of $CaF_2$, about 10 p.b.w. of $Cr_2O_3$, about 20 p.b.w. of $K_2Ti_3O_7$, and about 3 p.b.w. of manganese.

12. The electrode of claim 4 wherein the coating also comprises up to about 10 p.b.w. of manganese.

References Cited

FOREIGN PATENTS 165,685  4/1950  Austria _____ 117—202

WILLIAM L. JARVIS, Primary Examiner

U.S. Cl. X.R.

117—202; 148—26; 219—146